April 9, 1963 H. H. WEBER ETAL 3,084,581
MACHINE FOR MAKING GARMENT BAGS AND THE LIKE
Filed Jan. 6, 1958 8 Sheets-Sheet 1

INVENTORS
HERBERT H. WEBER
HELMUTH WAGGERHAUSER
BY
ATTORNEYS

April 9, 1963   H. H. WEBER ETAL   3,084,581
MACHINE FOR MAKING GARMENT BAGS AND THE LIKE
Filed Jan. 6, 1958   8 Sheets-Sheet 2

INVENTORS
HERBERT H. WEBER
HELMUTH WAGGERHAUSER
BY

ATTORNEYS

April 9, 1963 H. H. WEBER ETAL 3,084,581
MACHINE FOR MAKING GARMENT BAGS AND THE LIKE
Filed Jan. 6, 1958 8 Sheets-Sheet 3

INVENTORS
HERBERT H. WEBER
HELMUTH WAGGERHAUSER
BY
ATTORNEYS

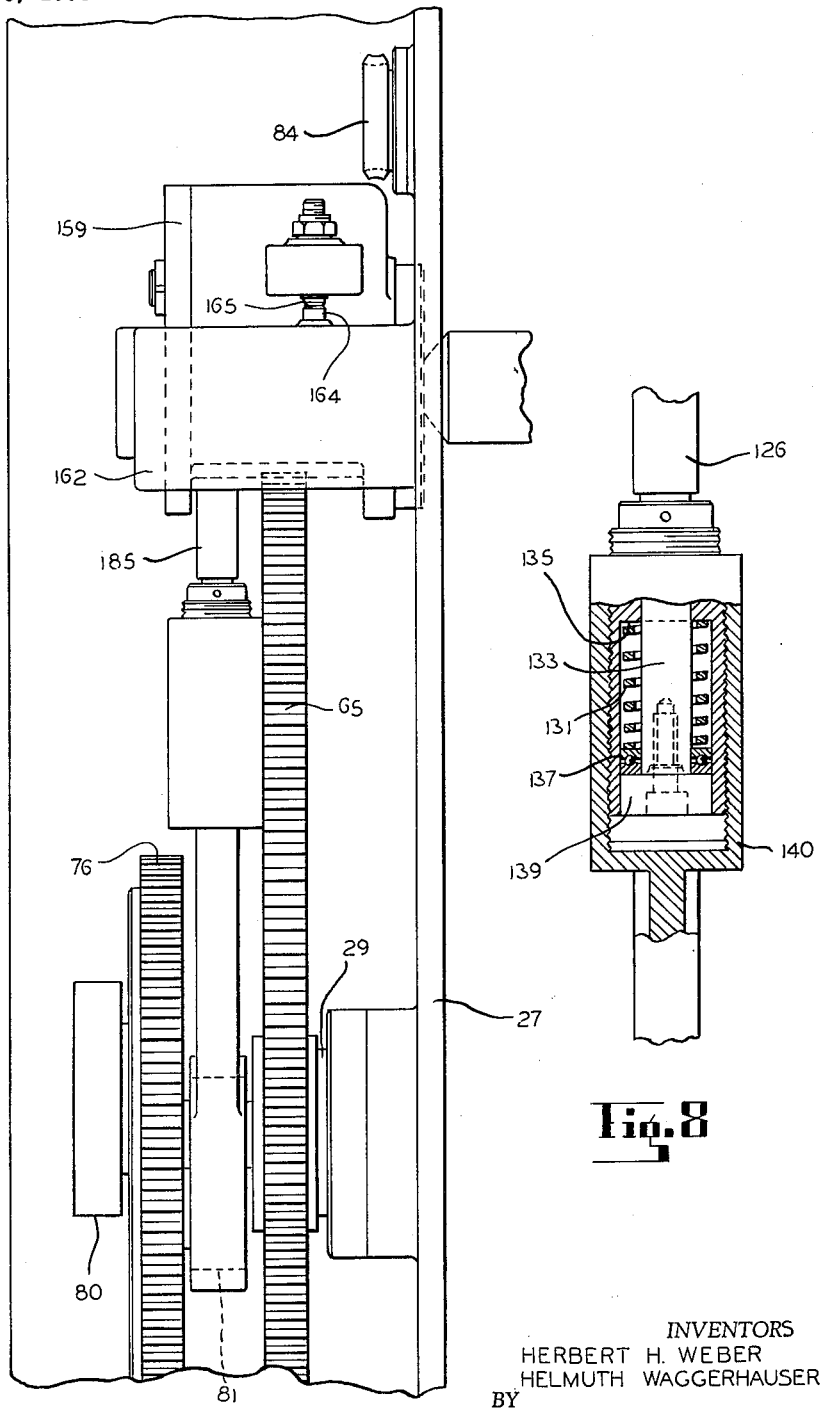

April 9, 1963 H. H. WEBER ETAL 3,084,581
MACHINE FOR MAKING GARMENT BAGS AND THE LIKE
Filed Jan. 6, 1958 8 Sheets-Sheet 5
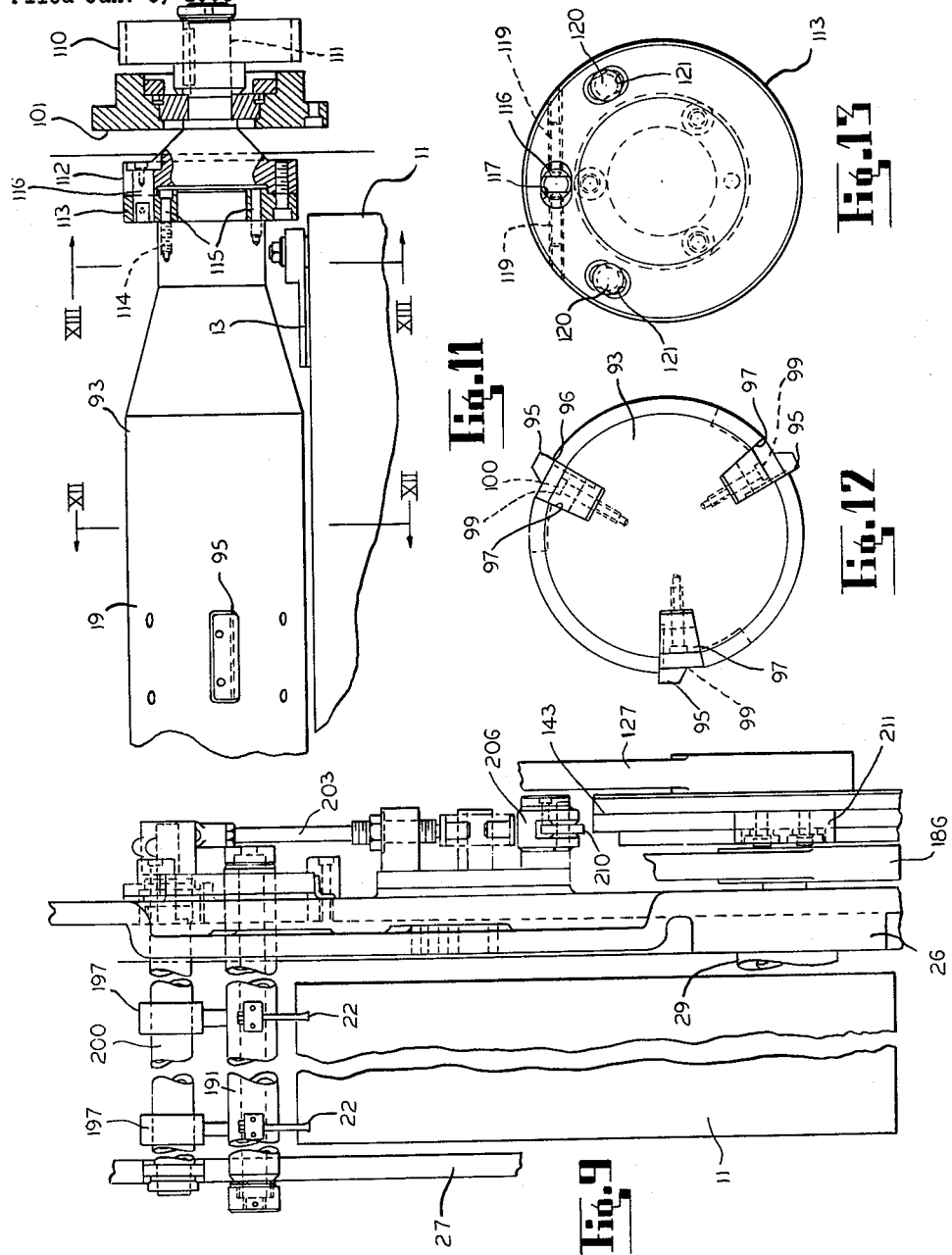
INVENTORS
HERBERT H. WEBER
HELMUTH WAGGERHAUSER
BY
ATTORNEYS

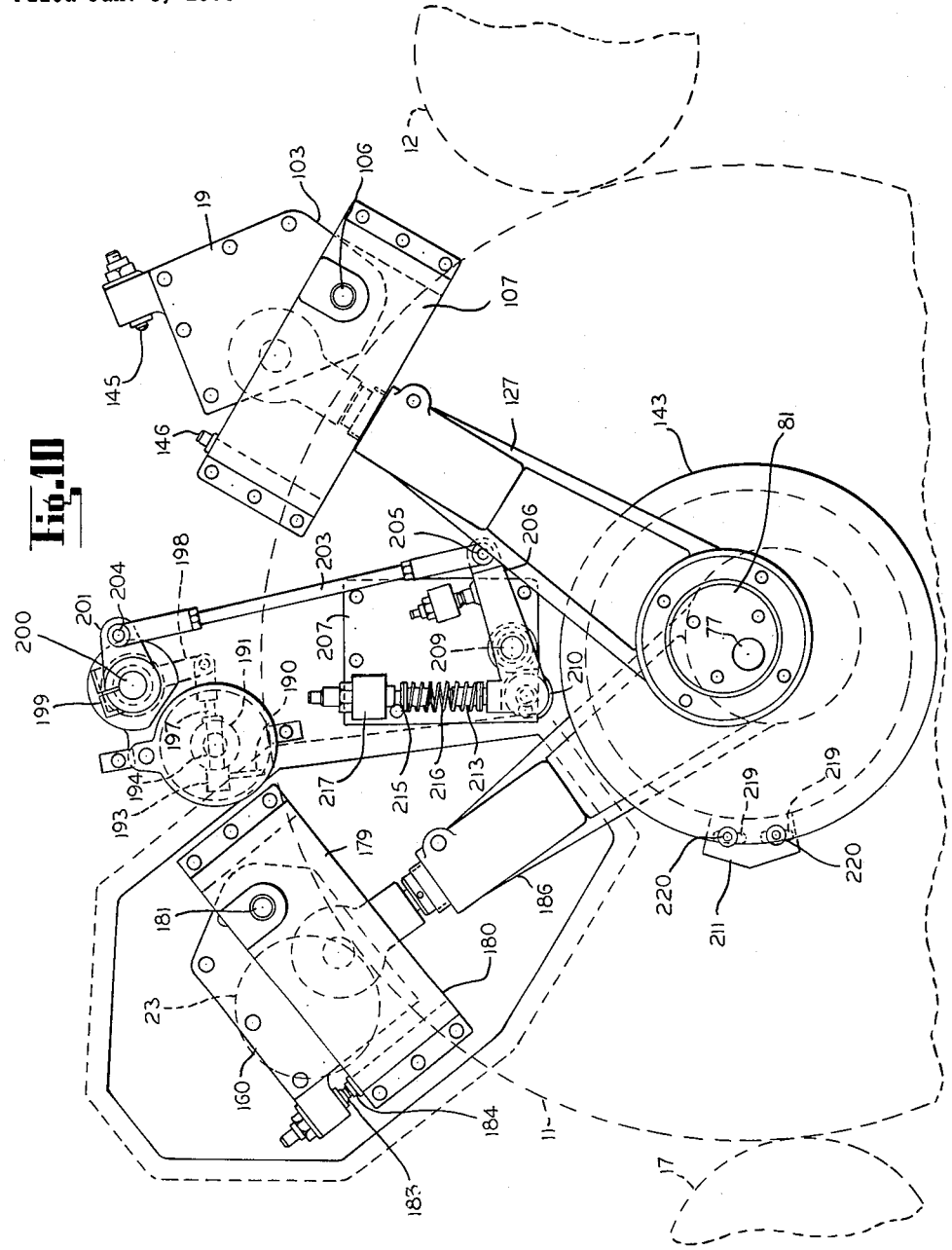

April 9, 1963 H. H. WEBER ETAL 3,084,581
MACHINE FOR MAKING GARMENT BAGS AND THE LIKE
Filed Jan. 6, 1958 8 Sheets-Sheet 7
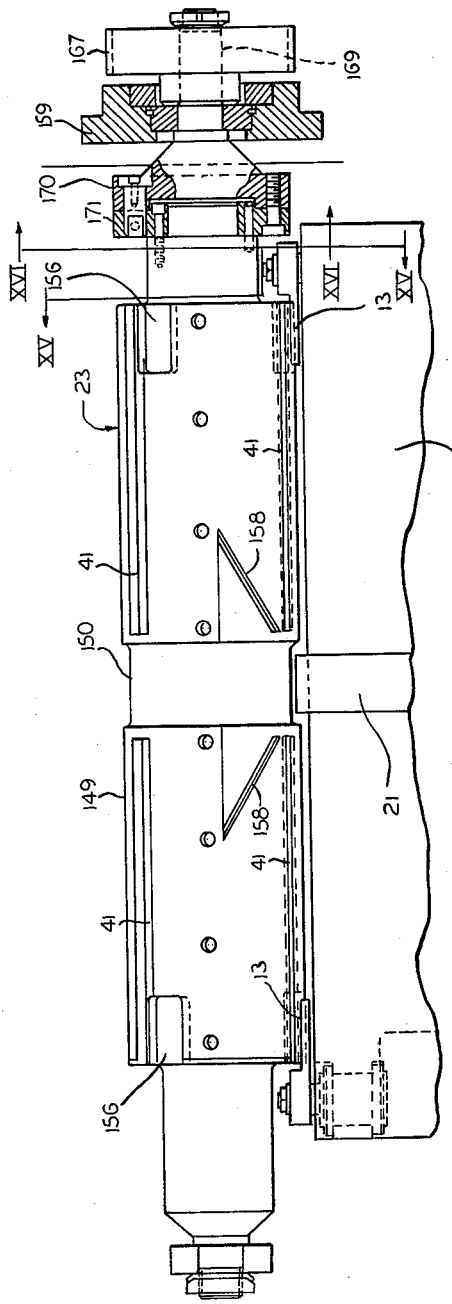
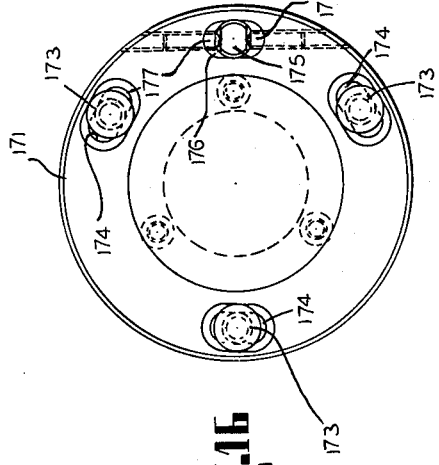
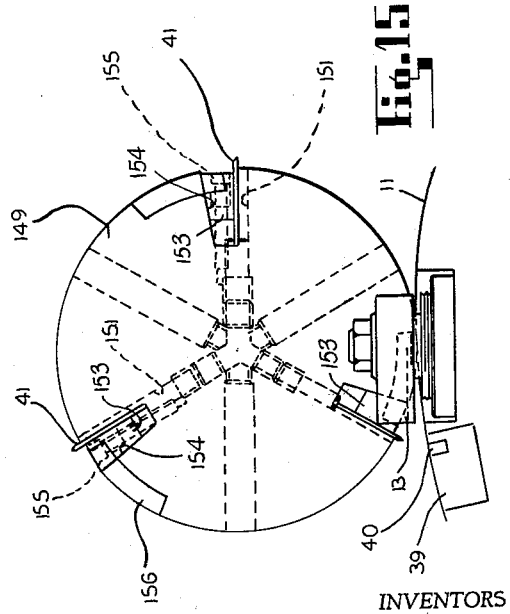
INVENTORS
HERBERT H. WEBER
HELMUTH WAGGERHAUSER
BY
ATTORNEYS

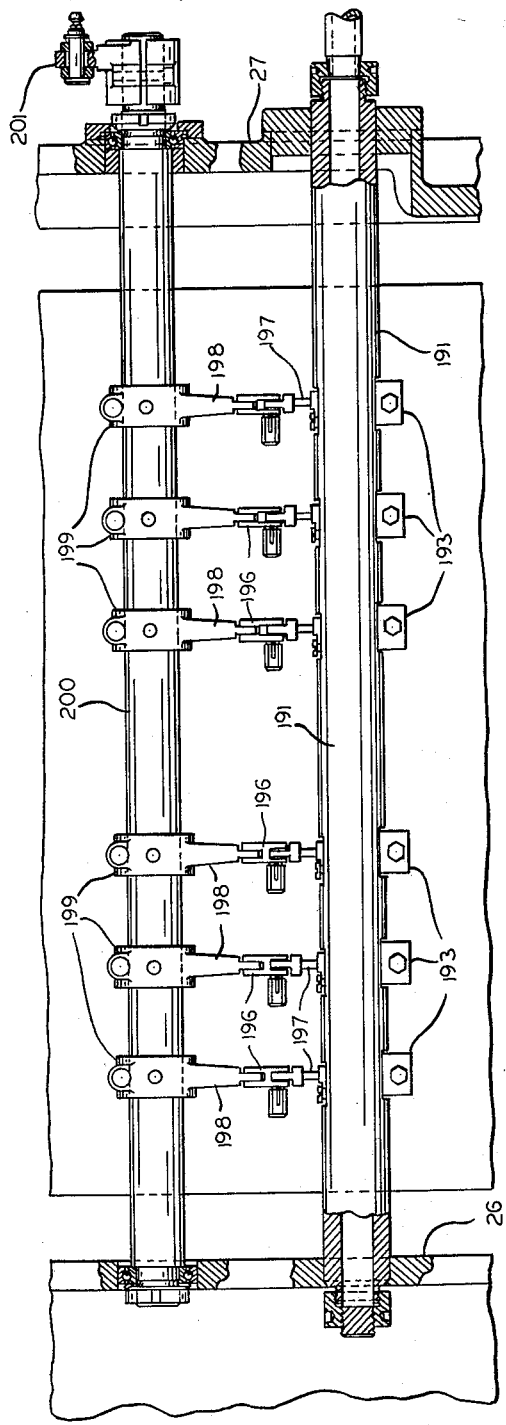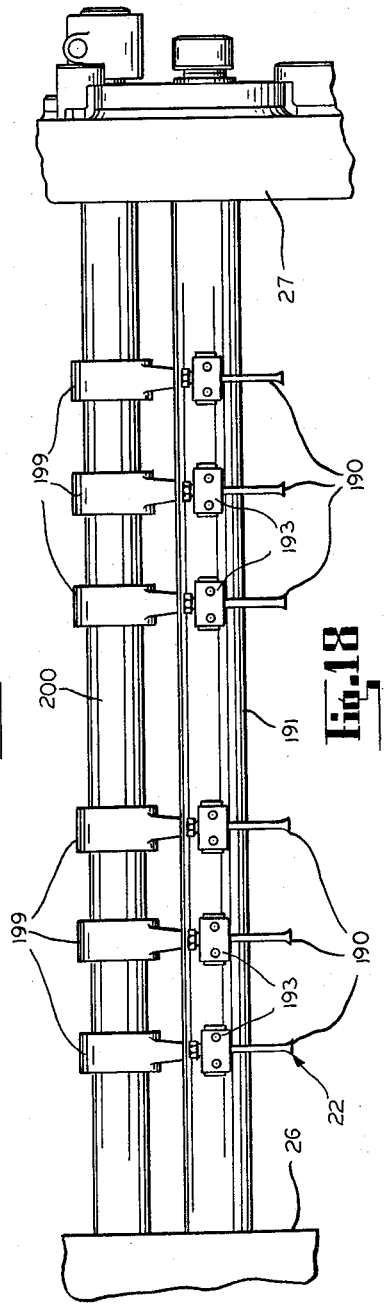

United States Patent Office 3,084,581
Patented Apr. 9, 1963

3,084,581
MACHINE FOR MAKING GARMENT BAGS
AND THE LIKE
Herbert H. Weber, Sheboygan, and Helmuth Waggershauser, Waukesha, Wis., assignors to H. G. Weber and Company, Inc., Kiel, Wis., a corporation of Wisconsin
Filed Jan. 6, 1958, Ser. No. 707,239
8 Claims. (Cl. 83—300)

This invention relates to apparatus for making garment bags and the like.

A principal object of the invention is to provide a simple and improved apparatus for making garment bags and the like in a simpler and more expeditious manner than formerly.

A further object of the invention is to provide a novel and improved apparatus for making garment bags and the like from a continuous length of a flattened tube of fabric or paper traveling along a traveling surface, in which a simplified form of slitting means for the traveling tube is provided, together with means for bringing the slitting means into engagement with the traveling tube in timed relation with respect to the rate of travel thereof.

A still further object of the invention is to provide an improved form of garment bag making machine having an improved support for the slitting knives, together with improved means for bringing the knives into slitting engagement with the traveling tube for forming the garment bag.

A still further object of the invention is to provide a garment bag making machine, forming the bag from a flattened tube held to a traveling surface, in which the forming of the bag is effected by a series of sequential tab cutting and web shearing operations and in which the shearing operation is performed sequentially of the tab cutting operation and effects slitting of the tube in intersecting relation with respect to the base of the tab formed by the cutting operation, to sever the tube to length and to leave a notch in the leading end of the severed tube.

These and other objects of the invention will appear from time to time as the following specification proceeds and with reference to the accompanying drawings wherein:

FIGURE 7 is a fragmentary end view of the machine with the gear covers removed and looking at the machine toward the opposite end thereof from FIGURE 2;

FIGURE 8 is an enlarged detail view showing certain details of one of the eccentric straps;

FIGURE 9 is a fragmentary end view of the machine, looking at the machine from the same end thereof as in FIGURE 7, but showing the gear covers removed and showing the drive side of the machine;

FIGURE 10 is a fragmentary side view of the machine, looking at the machine at the opposite side thereof from FIGURE 1, with the gear covers and certain other parts removed in order to illustrate the tilting means for the rotatable knife carriers to bring the knives into and out of engagement with the work and the means for spotting the traveling tube with glue;

FIGURE 11 is a fragmentary view in end elevation of the machine with certain parts removed and certain other parts broken away in order to shown a portion of the cutter;

FIGURE 12 is a fragmentary sectional view taken substantially along line XII—XII of FIGURE 11;

FIGURE 13 is a fragmentary sectional view taken substantially along XIII—XIII of FIGURE 11;

FIGURE 14 is a fragmentary end view of the machine, with certain parts broken away and certain other parts removed in order to show the slitting cutter;

FIGURE 15 is a fragmentary sectional view taken substantially along XV—XV of FIGURE 14;

FIGURE 16 is a fragmentary sectional view taken substantially along line XVI—XVI of FIGURE 14;

FIGURE 17 is a fragmentary plan view of the machine with certain parts broken away and certain other parts shown in section, and illustrating the glue spotters for spotting the traveling tube with glue; and FIGURE 18 is a fragmentary side view of the glue spotters.

Figure 1:
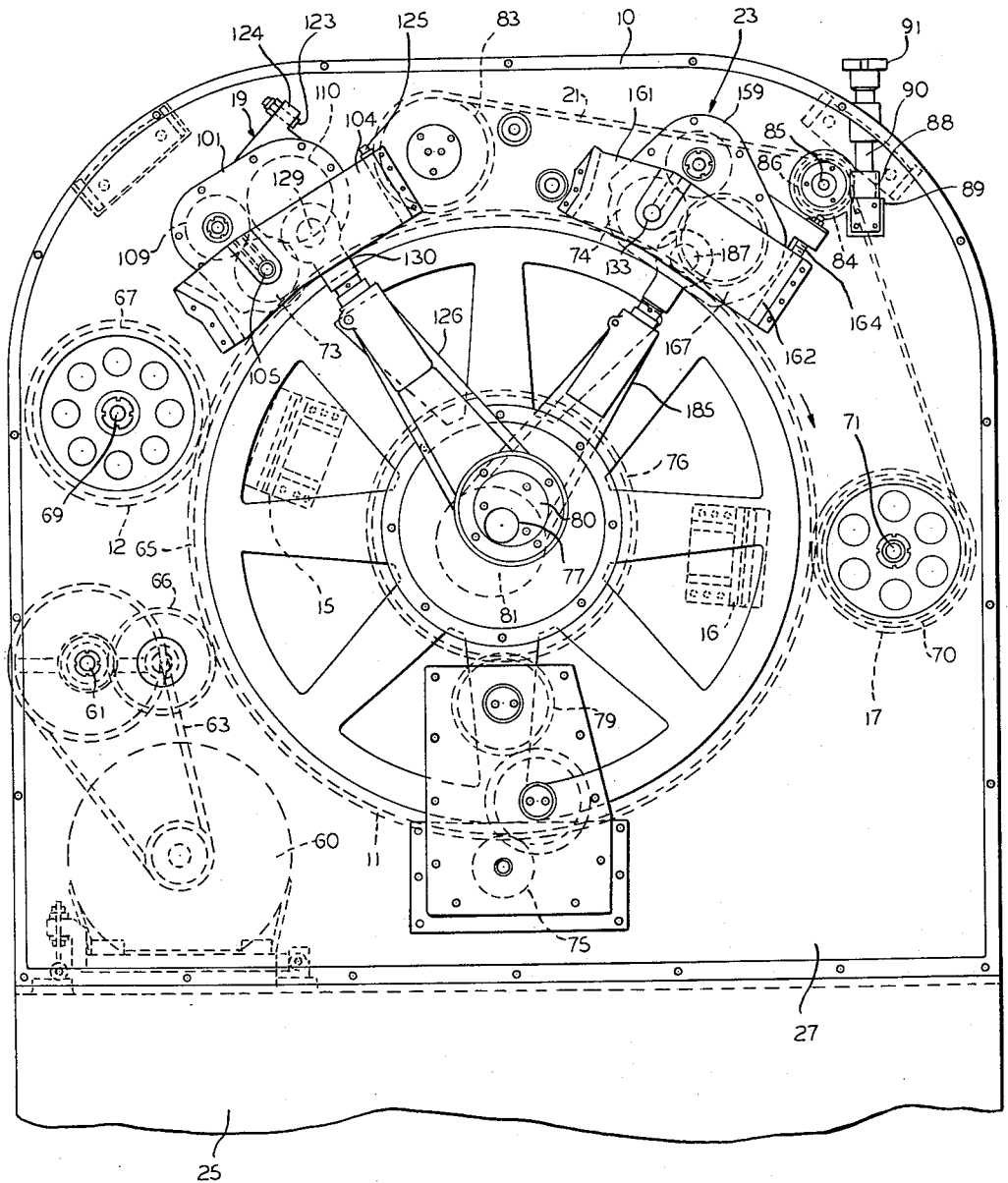
FIGURE 1 is a view in side elevation of a garment bag making machine constructed in accordance with the invention, looking at the machine from the gear end thereof, with the gear cover therefor removed.

In the embodiment of the invention illustrated in the drawings, we have shown a garment bag making machine 10 operating on principles similar to the garment bag making machine shown and described in application Serial No. 639,022, filed by Herbert H. Weber on February 8, 1957, and entitled "Method and Apparatus for Making Garment Bags and the Like" and now Patent No. 2,933,023. The machine 10 draws a flattened tube of fabric or paper (not shown) from a storage reel (not shown) onto a traveling working surface in the form of a rotatably driven drum 11, by means of a draw roll 12. As the flattened tube of fabric or paper is drawn onto the drum 11, it is retained thereto by retaining fingers 13, shown in FIGURES 3, 4, 5 and 6, and pivotally mounted on opposite sides of the drum and moved by a cam 15 adjacent the draw roll 12, into an open position to accommodate the flattened tube to be drawn onto the drum and moved to an open position by a cam 16 adjacent a folding drum 17, to accommodate the finished tube to be removed from the machine and transferred onto a conveyor (not shown) or the like, carrying the finished garment bag for packing or storage.

As the flattened tube of paper or fabric is drawn to the drum 11 by the draw roll 12 and retained thereto by the retaining fingers 13, it first passes under a cutter 19, first cutting an elongated generally U-shaped slit along the center and leading end portion of the tube, and then cutting uniformly spaced elongated U-shaped slits in the center of the tube at regularly spaced intervals, determined by the required length of the completed garment bags.

As the tube leaves the cutter 19, it passes under a traveling endless belt 21 extending along the central portion of the drum 11 and slightly narrower than the width of the elongated U-shaped slit cut by the cutter 19. The belt 21 retains the central portion of the flattened tube to the drum during the remaining work operations performed thereon to the folding roll 17 about which said belt changes its direction of travel.

The flattened tube then passes under glue spotters 22 shown in FIGURES 2, 9, 17 and 18 spaced transversely along the drum to spot the top surface of the advance portion of the tube with glue.

The tube then passes under a slitting cutter 23, transversely cutting the tube along opposite sides of the elongated arcuate slit portion thereof and intersecting said arcuate slit portion and during the slitting operation the advance portion of the tube is creased at rearwardly extending angles from opposite sides of the retainer belt 21, to accommodate the creased portions thereof to be folded backwardly along the tube by the folding roll 17, at which time the retaining fingers 13 are moved out of the way of the completed bag by the cams 16, and will hereinafter more clearly appear as this specification proceeds.

Figure 2:
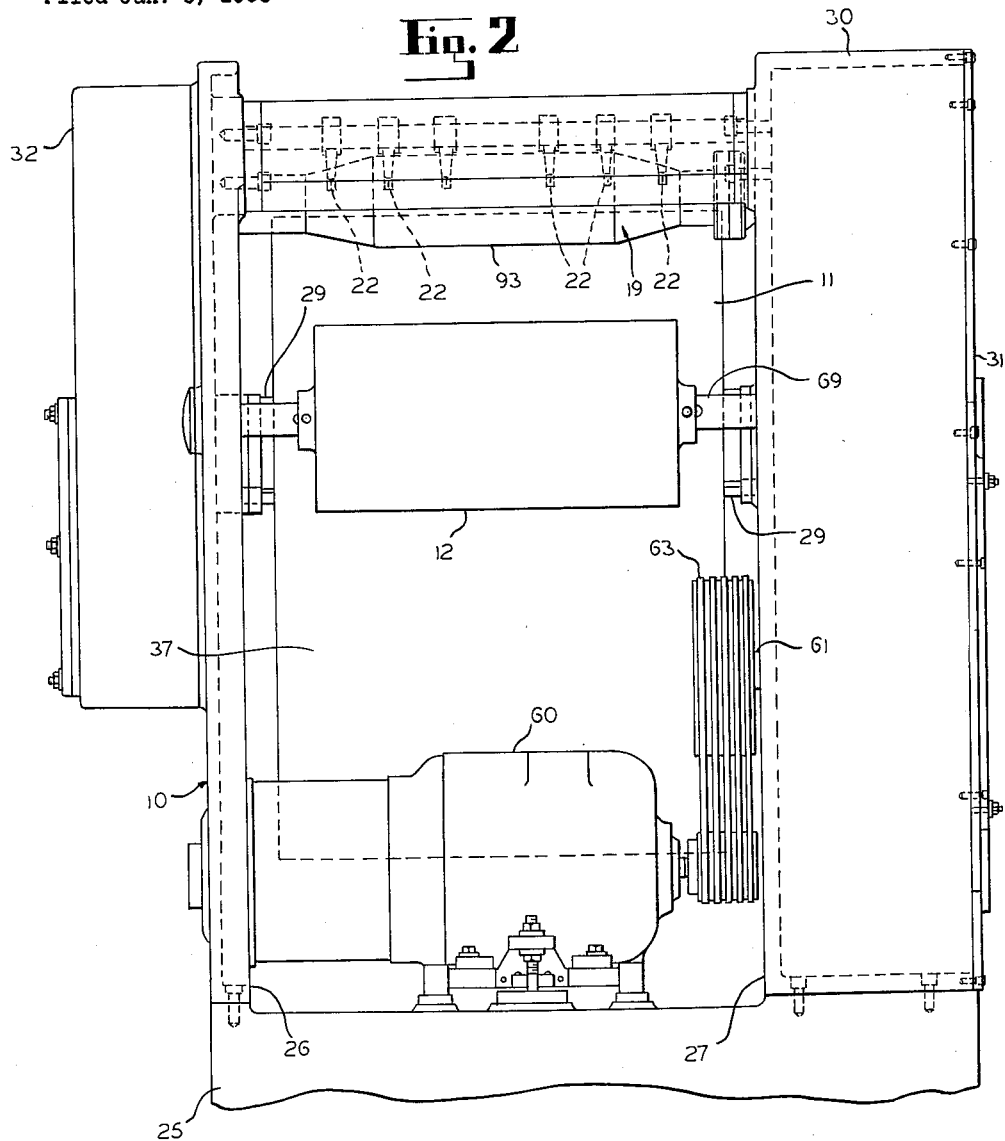
FIGURE 2 is an end view of the machine shown in FIGURE 1 looking at the machine toward the entering end thereof.
Figure 1A:
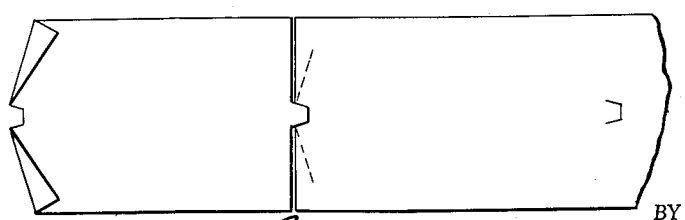
FIGURE 1a is a diagrammatic plan view of a flat tubular web showing the steps of forming the web into a bag.

Referring now in particular to FIGURES 1 and 2, the machine 10 is shown as comprising a base 25 having parallel spaced side frame members 26 and 27, extending upwardly along opposite sides thereof and forming a support for the rotatable drum 11 on a transverse shaft 29, suitably journaled in said side frame members. A gear housing 30 is mounted on and extends upwardly from the base 25 along the side frame member 27 and extends outwardly along said base outwardly from the side frame member 27, and forms a housing enclosing the gearing for driving the drum 11, the draw roll 12, the folding roll 17 and the cutters 19 and 23. Said gear housing is closed at its outer side by end covers 31. A housing 32 extends outwardly from the side frame member 26 and encloses the mechanism for lifting and lowering the cutters 19 and 23 and the mechanism for operating the glue spotters 22.

Figure 3:
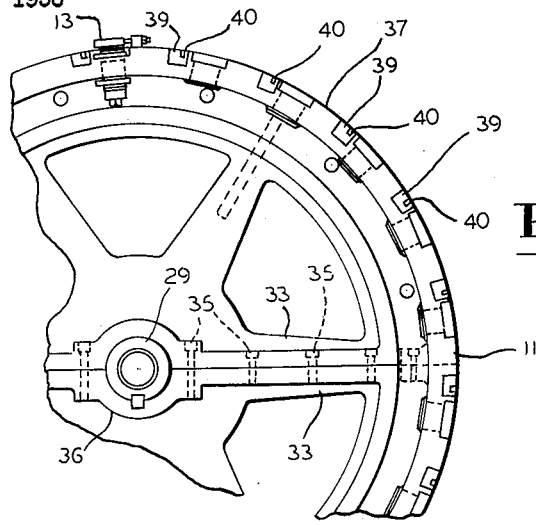
FIGURE 3 is a fragmentary side view of the drum for carrying the traveling tube.
Figure 4:
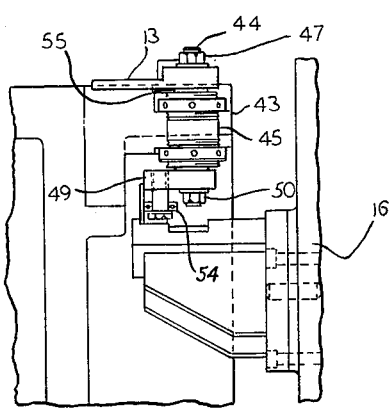
FIGURE 4 is a fragmentary side view of the machine with certain parts broken away and certain other parts shown in section in order to show a hold down finger and cam associated therewith, for holding the traveling flattened tube to its drum.
Figure 5:
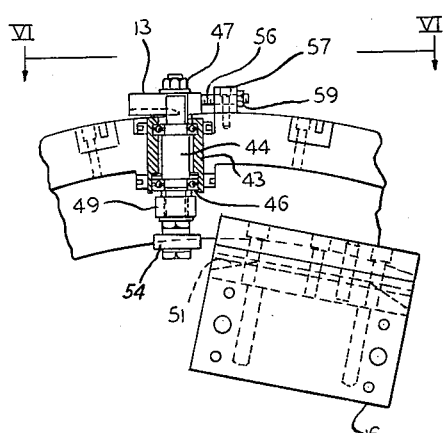
FIGURE 5 is a fragmentary view in side elevation, showing a hold down finger and an operating cam therefor.
Figure 6:
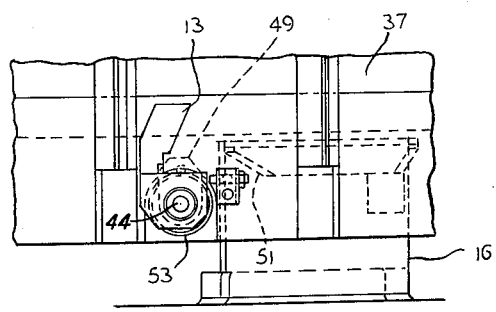
FIGURE 6 is a fragmentary plan view of a hold down finger and cam looking in the direction of the arrows VI—VI of FIGURE 5.

The drum 11 is shown in FIGURE 3 as being of a generally spider like construction in end elevation, having end spiders 33 of a split construction, retained together by bolts or machine screws 35 and having a central split hub 36 keyed or otherwise secured to the transverse drive shaft 29. The drum 11 has a cylindrical surface 37 extending between the end spiders 33 and having inserts 39 imbedded therein and extending thereacross. The inserts 39 are spaced along the surface of the drum at regular intervals in accordance with increments in length of the garment bags that may be made, which may be spacings of six inches from the center lines of slots 40, extending inwardly along said inserts to positions adjacent the hold down belt 21. The slots 40 are adapted to receive slitting knives 41 of the cut-off cutter or slitter 23, slitting the garment bag to the required length as the knives 41 pass into the slots 40, and lifting the creased sides of the bag at the termination of the slitting operation, to be folded backwardly by the folding drum 17.

The drum 11 also has rims 43 extending laterally from opposite sides of the cylindrical surface 37 thereof, beyond the end spiders 33 and forming pivotal mountings for the retainer fingers 13 on radially extending pivot pins 44. The pivot pins 44 are journaled in sockets 45 spaced along the rims 43, on ball bearings 46 (see FIGURE 5). The retainer fingers 13 may be keyed or otherwise secured to the upper ends of the pivot pins 44 and may be retained thereto as by nuts 47 threaded on the upper ends thereof. The lower end of each pivot 44 has an arm 49 keyed or otherwise secured thereto, and extending inwardly therefrom and retained to said pin as by a nut 50 threaded on the lower end thereof. The arm 49 has a follower roller 54 on the end thereof, adapted to be engaged by inclined cam surfaces 51 of the cams 16, to effect movement of the fingers 13 to release the completed bag from the drum 11, and to be engaged by similar cam surfaces (not shown) of the cam 15, to effect movement of the retainer fingers 13 into an open position to accommodate the feed drum 12 to feed a flattened tube onto the face of the drum 11. Each finger 13 is biased into a tube retaining position by a torsion spring 53, encircling the pivot shaft 44 and engaged with the arm 13 at one end and with the wall of the socket 45 at its opposite end. A stop in the form of an adjustable screw 56 is provided in each retainer finger to limit movement of the retainer finger 13 to its inwardly extended position. As herein shown, the stop 56 is threaded within a bracket 57 extending outwardly from the rim 43, and is locked in position as by a nut 59.

It should be understood that the retainer fingers 13 are spaced along the drum 11 for the full circumference thereof and that the means for operating the retainer fingers 13 on each side of the drum is similar, so the operating means on one side of the drum only need herein be shown or described. The retainer fingers 13 are also spaced rearwardly of the slots 40 which receive the slitting knives 41, a distance sufficient to release the slit advance end portion of a flattened tube to accommodate it to be folded backwardly by the folding drum 17, as the advance end of the bag passes thereunder.

The drum 11 is driven by a motor 60 mounted on the base 25 and driving a transverse shaft 61 through a V-belt drive 63. The shaft 61 is journaled in the side frame member 27 and extends within the gear housing 30 (FIGURES 1 and 2). The shaft 61 has a drive connection with a master gear 65 through a reduction gear train 66. The master gear 65 is keyed or otherwise secured to the drum drive shaft 29 for rotatably driving said shaft.

The master gear 65 also meshes with a spur gear 67, keyed or otherwise secured to a support shaft 69 for the draw roll 12, for rotatably driving said draw roll at the peripheral speed of the drum 11. The gear 65 also meshes with and drives a spur gear 70 keyed or otherwise secured to a support shaft 71 for the folding drum 17, for rotatably driving said folding drum and the belt 21 at the peripheral speed of the drum 11. The gear 65 also meshes with a spur gear 73 for rotatably driving the lip cutter 19 and meshes with a spur gear 74 for rotatably driving the slitter cutter 23, as will hereinafter more clearly appear as this specification proceeds.

The gear 65 also meshes with and drives a spur gear 75, for driving a spur gear 76, keyed or otherwise secured to a transverse shaft 77, through a reduction gear train 79 indicated in FIGURE 1. The shaft 77 is concentric with and extends through the hollow interior of the shaft 29 and serves to drive eccentrics 80 and 81 mounted on said shaft adjacent each end thereof, the eccentrics 80 and 81 being out of phase relation with respect to each other, for lifting the respective cutter 19 and slitter 23 out of cutting engagement with the flattened tube traveling along the drum 11, and moving said cutters into cutting engagement with the tube traveling along said drum in the required sequence, to form a garment bag of the desired length.

It should here be understood that the diameters of the gear 75 and the reduction gears 79 may be varied to vary the speed of rotation of the shaft 77 and the eccentrics 80 and 81, to increase or decrease the time of lifting and lowering of the cutter 19 and slitting cutter 23, with respect to the peripheral speed of rotation of the drum 11, to thereby accommodate the length of the garment bags made to be selected, it being understood that the lengths may vary in increments of six inches, the spacing between the inserts 39.

The endless hold down belt 21 is shown as being trained about an idler roller 83 at the discharge end of the lip cutter 19, and as being wrapped about the periphery of the drum 11 to the folding drum or roll 17, about which said belt reverses its direction of travel. From the folding drum or roll 17, the belt 21 is trained upwardly about a tension idler 84 to and around the idler 83.

The tension idler 84 is mounted on a shaft 85 extending outwardly from a side face of a worm gear 86, mounted in the side frame member 27 eccentric of the center of the shaft 85. The worm gear 86 meshes with a worm 88 in a housing 89 and mounted on a shaft 90. Turning of the hand wheel 91 on the outer end of the shaft 90 will thus vary the position of the shaft 85 with respect to the center of rotation of the worm 86 and take up tension on or relieve tension from the endless belt 21, in an obvious manner.

Referring now to FIGURES 12 and 13, and the cutter 19, said cutter includes a roll 93 spaced from the periphery of the drum 11 and having a plurality of generally U-shaped cutters 95 projecting from the face thereof, and shown in FIGURE 12 as being spaced about the drum 93, 120° apart. The cutters 95 are adapted to cut U-shaped slits in the center of the flattened tube and form an opening in the completed garment bag, through which a hanger for clothes and the like may extend.

The cutters 95 are herein shown as being mounted in sockets 96 extending inwardly from the periphery of the drum 93. Each socket 96 has an enlarged outer end portion 97, receiving a block 99 fitting within an open portion of the cutter 95 and secured in position to retain the cutter to the socket 96, as by cap screws 100.

The roll 93 is journaled at its opposite ends in rockable carriers 101 and 103, mounted for rocking movement about axes coaxial with the axis of the drive gear 73, meshing with the gear 65. The carriage 19 is journaled at one end in the side frame member 27 and at its opposite end in the outer wall of a generally U-shaped yoke 104, secured to the side frame member 27 at the inner ends of the legs of said yoke. As herein shown, a shaft 105 having the gear 73 journaled thereon forms the pivotal support for the carrier 101 and is mounted in the outer wall of the yoke 104 at one end and in the side frame member 27 at its opposite end and has the carrier 101 suitably journaled thereon.

The carrier 103 supporting the opposite end of the roll 93 from the carrier 101 is shown in FIGURE 10 as being pivotally mounted on a transverse shaft 106, mounted at its inner end in the side frame member 26 and at its opposite end in the outer wall of a U-shaped yoke 107 secured to the side frame member 27 at the inner ends of its legs, and projecting outwardly therefrom.

The drive from the gear 73 to the drum 93 is shown in FIGURE 1 as including a gear 109 meshing with and driven from the gear 73, and a gear 110 driven from the gear 109. The gear 110 is shown in FIGURE 11 as being keyed or otherwise secured to a shaft 111, journaled in the inner side wall of the carriage 101. The shaft 111 is shown as having a disk 112 formed integrally with its inner end and abutting a disk 113 secured to a reduced end portion 114 of the roll 19, by cap screws 115 or the like. The drive connection from the disk 112 to the disk 113 includes a drive pin 116 mounted in the disk 112 and extending inwardly therefrom through a slot 117 in the disk 113. Threaded screws, threaded within the disk 113 from opposite sides of the pin 116, are provided to engage opposite sides of said pin and form a drive from the disk 112 to the disk 113, accommodating the angular positions of the disks 112 and 113 to be varied with respect to each other, to afford a means for adjusting the drum 93 and cutters 95 to the speed of rotation of said drum and the length of the garment bag to be formed. Cap screws 120 extending through slots 121 in the disk 113 are threaded within the disk 112 to fixedly secure said disks to each other and to accommodate angular adjustment of said disks with respect to each other.

An adjustable stop 123 threaded within a lug 124 extending forwardly of the carrier 101 and engageable with an abutment 125 projecting from the U-shaped yoke 104, is provided to limit movement of the carrier 101 toward the drum 11, and to thereby limit the depth of cut, and to prevent injury to the inserts 39 and the cutters 95 during the lip cutting operation.

The carriers 101 and 103 and roll 93 are angularly moved in unison about the axis of the shaft 105 by eccentric straps 126 and 127 (see FIGS. 1 and 10). The eccentric strap 126 is suitably journaled on the cam 80 on the outside of the gear 76 and is journaled at its opposite end on a shaft or pin 129, mounted in a carriage 101. The eccentric strap 126 has a head portion 130 journaled on the pin 129 and slidably movable within the strap 126 and retained in retracted relation with respect to said strap as by a spring 131, encircling the shaft portion 133 of said eccentric strap and interposed between an inner wall 135 of a cup-like retainer 136 and an upper race of a thrust bearing, abutting a head 139 secured to the end of the rod or shaft 133. The retainer 136 is shown as being threaded within a cylindrical portion 140 of the eccentric strap 126, to accommodate adjustment of the length of the eccentric strap. The spring 131 is of sufficient strength to normally act as a solid member, but will yield when the stop 123 comes into engagement with the abutment 125.

The eccentric strap 127 on the opposite side of the machine from the eccentric strap 126 is journaled on the opposite eccentric 80, keyed or otherwise secured to the shaft 77 on the outside of a cam disk 143. The eccentric strap 127 is also like the eccentric strap 126, so need not herein be shown or described in detail. The eccentric strap 127 has pivotal connection with the carrier 103 on a pivot pin 143 suitably mounted in said carrier. The carrier 103 like the carrier 101 has an adjustabel stop 145 engageable with an abutment 146 limiting inward movement of the carrier 103 with respect to the face of the drum 11.

The slitter 23 is herein shown as being in the form of a roll 149 having a recessed central portion 150 slightly wider than the width of the hold down belt 21, and having a plurality of angularly spaced sockets 151 formed therein by drilling radially from the face of the roll 149. Each socket 151 is adapted to form a mounting for a slitter knife 41, held in position in said socket as by a block 153, generally wedge shaped in cross section. The blocks 153 engage inclined walls 154 of the sockets 151, to wedge the knives 41 in position. Cap screws 155 are provided to hold the blocks 153 in wedging engagement with the knives 41. Recesses 156 are formed in the roll 149 adjacent opposite ends of the knives 41. The recesses 156 communicate with the sockets 151 and afford access to the knives 41, to accommodate ready removal thereof upon loosening of the cap screws 155.

The slitter 23 is herein shown as having creaser blades 158 mounted on the roll 141 behind the knives 41 on opposite sides of the belt 21. The creaser blades 158 extend angularly outwardly from the inner ends of the knives 41 in a direction opposite to the direction of rotation of the roll 141, as in my Patent No. 2,933,023, previously mentioned.

The roll 139 and knives 41, forming the slitter 23, are rotatably mounted on rockable carriages 159 and 160. The carriages 159 and 160 are mounted at opposite sides of the drum 11 and are like the carriages 101 and 103 previously described. The carriage 159 is herein shown as being rockingly mounted between the side frame member 27 and an outer wall 161 of a generally U-shaped yoke 162, on a transverse shaft 133, forming a bearing mounting for the drive gear 74, and having the carriage 159 journaled thereon. A stop 164 engageable with an abutment 165 is provided to limit movement of the carriage 159 toward the drum 11. The roll 149 is driven from the spur gear 74 at the speed of rotation of the roll 93 through a spur gear 166, meshing with and driven from the gear 74, and meshing with and driving a spur gear 167 coaxial with the axis of the drum 149. The spur gear 167 is keyed or otherwise secured to a shaft 169 journaled intermediate its ends in the carrier 159 and extending inwardly therefrom.

The drive from the shaft 169 to the drum 149 is like the drive from the shaft 111 to the drum 93 and includes two abutting disks 170 and 171, the disk 170 being integral with the shaft 169, and the disk 171 being secured to the end of the roll 141. The disks 170 and 171 are retained in driving engagement with respect to each other by cap screws 173 extending through slots 174 in the disk 171 and threaded within the disk 170. A pin 175 extends from the disk 170 through a slot 176 in the disk 171 and is abutted at its opposite sides by adjustment screws or plugs 177 threaded within the disk 171. Said adjustment screws thus afford a means for accurately adjusting the angular positions of the knives 41 and disk 171 with respect to the disk 170, to register said knives with the slots 40 formed in the faces of the inserts 39 and extending therealong.

The carrier 160 is mounted between the outside of the frame member 26 and an outer wall 179 of the yoke 180, on a transverse shaft 181, coaxial with the axis of the shaft 133. Inward movement of the carrier 160 is limited by a stop 183, adjustably mounted on said carrier and engaging an abutment 184 mounted on and extending outwardly of the yoke 180, for registry with the stop 183.

The carriers 159 and 160 are rockably moved together toward and from the drum 11, to bring the knives 41 into slitting engagement with the flattened fabric tube, to slit the tube to length, by means of eccentric straps 185 and 186 like the eccentric straps 126 and 127 so not herein shown or described in detail. The eccentric strap 185 is journaled on the eccentric 81 on the inside of the gear 76 and is pivotally connected to the carrier 159 on a pivot pin 187. The eccentric strap 186 is journaled on the opposite eccentric 81 keyed or otherwise secured to the shaft 77, on the inner side of the cam disk 143. The eccentric strap 186 has pivotal connection with the carrier 160 on a pivot pin 189.

Referring now in particular to the glue spotter 22 for spotting the upper surface of the traveling flattened tube with glue, adjacent the leading end thereof, to effect the gluing of the backwardly folded leading end portions of the tube to the top surface thereof, as the tube passes under the folding roll 17, said glue spotter is herein shown as being in the form of a plurality of tubes 190 spaced from the periphery of a hollow shaft 191, and extending at right angles to a diametral line extending through said shaft. Each glue spotter tube 190 leads downwardly from a fitting 193, secured to the end of a sleeve 194, mounted on and extending diametrically within the hollow shaft 191. The hollow shaft 191 is rockably mounted at its opposite ends in the side frame members 27 and 26, and the hollow interior thereof forms a reservoir for glue. A piston 197 is slidably mounted within the tube 194 for reciprocal movement with respect thereto, to form in effect a pump, to supply glue to the associated tubes 190 during each pressure stroke of said piston as in the Herbert H. Weber Patent No. 2,933,023 previously mentioned. The pistons 197 are connected at their outer ends to arms 198 through links 196. The arms 198 extend from slit collars 199, mounted on a rock shaft 200 journaled in the side frame members 26 and 27.

The rock shaft 200 extends outwardly beyond the side frame member 27 and has an arm 201 extending outwardly therefrom connected with a link 203 as by a pivot pin 204. The link 203 extends downwardly from the arm 201 and is pivotally connected by a pivot pin 205 to one end of a lever arm 206, pivoted intermediate its ends to a bracket plate 207 on a pivot pin 209, extending outwardly from said bracket plate. The opposite end of the arm 206 from the link 203 has a follower roller 210 rotatably mounted thereon, engaged by a cam 211 adjustably mounted on the cam disk 143 and extending beyond the periphery thereof, to effect clockwise movement of the lever 206 and rock shaft 207 as well as the levers 98, upon engagement of the cam 211 with the follower roller 210 during each revolution of the cam disk 143.

The follower roller 210 is biased into engagement with the cam 11 by a compression spring 212 seated on a lug 213 extending upwardly from the end of the lever 206, adjacent the follower roller 210, and seated at its opposite end against a collar 215 spaced inwardly of the end of a seating member 216, threaded within a lug 217 mounted on and extending outwardly from the bracket plate 207 to vary loading of the spring 212 as required.

The cam 211 is slotted, as indicated by reference character 219, and is mounted on a disk 143 by bolts 220 or the like, to accommodate the position of the cam 11 to be adjusted with respect to the face of the disk 143 to adjust the location of spotting the leading end portion of the flattened tube with glue, in accordance with the lip cutting and slitting operations.

Since the glue spotters 22 are always a fixed distance in advance of the cutter 19 and beyond the slitting cutter 23, and since the drum 11 is always traveling at a constant rate of speed, said glue spotters are always in position to spot the upper surface of the advance portion of the flattened paper tube with glue regardless of the length of the garment bag being made. Adjustment of the cam 211 along the face of the cam disk 143, therefore, is only necessary to take care of varying speeds of the shaft 77 where the speed of said shaft may be changed for different lengths of garment bags.

In operation of the device, a flattened tube of fabric, paper or the like is fed from a reel (not shown) to the draw roll 12. As the tube comes into engagement with the nip between the draw roll and surface of the drum 11, the retainer fingers 13 will be moved outwardly by the cams 15, to accommodate the flattened tube to be drawn onto the drum. As the retainer fingers leave the cams 15 they will be moved by their spring bias to overlap the top edges of the tube to retain the tube to the drum until the final folding operation, at which time they will be released by the cams 16, as previously described.

As the tube progresses along the face of the drum to the cutter 19, the eccentrics 80 will move said cutter downwardly to engage the cutter 95 with the flattened tube and cut a generally U-shaped tab therein, and will then raise said cutter 19 out of engagement with the flat tube. As the tube continues to progress toward the slitter 23, the advance top portion thereof will be spotted with glue by the glue spotters 22. The eccentrics 81 will then bring the slitter 23 downwardly to bring the slitter knives 41 into engagement with the flattened tube in registry with the recesses 40 in the inserts 39. The slitter knives 41 will then slit the leading end portion of the tube in intersecting relation with respect to the base of the U-shaped tab cut by the cutter knife 95 at the same time creasing the tube by the creasers 158 and severing the tube and drawing the leading end of the tube upwardly as the slitter knives 41 are withdrawn therefrom. Since the edges of the slit and creased tube from the slit or severed portion thereof to the retainer fingers 13 are free, the leading edge portions of the tube on opposite sides of a longitudinal centerline thereof will turn upwardly by the air currents created by travel of the drum 11, the central portion of the tube being held down by the belt 21. The folding roll 17 then engaging the upwardly turned leading edge portion of the tube will fold the tube backwardly along the creased portions thereof onto the glued portion thereof and will deliver the tube in the form of a completed garment bag.

It will be understood that various modifications and variations in the present invention may be effected without departing from the spirit and scope of the novel concepts thereof.

We claim as our invention:

1. In a slitter, a frame, a drum journaled in said frame for rotation about a horizontal axis, the periphery of said drum forming a conveying and working surface, a motor, means driven by said motor for driving said drum including a drum drive gear coaxial with the axis of rotation of said drum and having driving connection therewith, a rotatable slitter spaced radially from the periphery of said drum and including a roll having at least one slitter knife extending across the face thereof, bearing support means for said roll supporting said roll for bodily movement toward and from the periphery of said drum comprising rockable carriers rotatably supporting each end of said roll and mounted on said frame for rocking movement with respect thereto, means rocking said carriers and bodily bringing said slitter knife into and out of cooperative relation with respect to the surface of said drum, means for driving said roll and slitter knife at the peripheral speed of said drum comprising a gear journaled in one of said carriers for rotation about an axis coaxial with the axis of rocking movement of said carrier and meshing with said drum drive gear, a gear journaled within said carrier coaxial with the axis of rotation of said roll, a geared drive connection between said gears, and an adjustable drive connection between said gear coaxial with the axis of rotation of said roll and said roll accommodating angular adjustment of said slitter knife with respect to said gear, for driving said roll.

2. In a slitter, a frame, a drum journaled in said frame for rotation about a horizontal axis, the periphery of said drum forming a conveying and working surface, a motor, means driven by said motor for driving said drum including a drum drive gear coaxial with the axis of rotation of said drum and having driving connection therewith, a rotatable slitter spaced radially from the periphery of said drum and including a roll having at least one slitter knife extending across the face thereof, bearing support means for said roll supporting said roll for bodily movement toward and from the periphery of said drum comprising rockable carriers rotatably supporting each end of said roll and mounted on said frame for rocking movement with respect thereto, means rocking said carriers and bodily bringing said slitter knife into and out of cooperative relation with respect to the surface of said drum, means for driving said roll and slitter knife at the peripheral speed of said drum comprising a gear journaled in one of said carriers for rotation about an axis coaxial with the axis of rocking movement of said carrier and meshing with said drum drive gear, a gear journaled within said carrier coaxial with the axis of rotation of said roll, a geared drive connection between said gears, and an adjustable drive connection between said gear coaxial with the axis of rotation of said roll and said roll accommodating angular adjustment of said slitter knife with respect to said gear for driving said roll, comprising two abutting disks, one being driven from said gear coaxial with the axis of rotation of said roll and the other being secured to said roll, means retaining said disks in abutting relation with respect to each other and accommodating angular movement of one with respect to the other, and means angularly moving one of said disks with respect to the other and retaining said disks in fixed relation with respect to each other.

3. In a slitter, a frame, a drum journaled in said frame for rotation about a horizontal axis, the periphery of said drum forming a conveying and working surface, a motor, means driven by said motor for driving said drum including a drum drive gear coaxial with the axis of rotation of said drum and having driving connection therewith, a rotatable slitter spaced radially from the periphery of said drum and including a roll having at least one slitter knife extending across the face thereof, bearing support means for said roll supporting said roll for bodily movement toward and from the periphery of said drum comprising rockable carriers rotatably supporting each end of said roll and mounted on said frame for rocking movement with respect thereto, means rocking said carriers and bodily bringing said slitter knife into and out of cooperative relation with respect to the surface of said drum, means for driving said roll and slitter knife at the peripheral speed of said drum comprising a gear journaled in one of said carriers for rotation about an axis coaxial with the axis of rocking movement of said carrier and meshing with said drum drive gear, a gear journaled within said carrier coaxial with the axis of rotation of said roll, a geared drive connection between said gears, an adjustable drive connection between said gear coaxial with the axis of rotation of said roll and said roll accommodating angular adjustment of said slitter knife with respect to said gear for driving said roll, comprising two abutting disks, one being driven from said gear coaxial with the axis of rotation of said roll and the other being secured to said roll, means retaining said disks in abutting relation with respect to each other and accommodating angular movement of one with respect to the other, and means angularly moving one of said disks with respect to the other and retaining said disks in fixed relation with respect to each other, comprising a pin extending from one of said disks, an elongated slot in the other of said disks receiving said pin, and adjustment screws threaded in said disk having said slot therein, in intersecting relation with respect to said slot, for abutting engagement with opposite sides of said pin.

4. In a garment bag making machine, a frame, a drum rotatably mounted on said frame having a peripheral surface forming a material carrying and working surface, a rotatable cutter cooperating with said drum to cut a U-shaped tab in both sides of a flattened tube traveling along said drum, a slitter spaced circumferentially from said rotatable cutter in advance thereof and cooperating with said drum to transversely slit the tube in intersecting relation with respect to the base portion of the tab, to sever the tube into individual tubes of equal length having forwardly opening notches in the leading ends thereof, rockable carriers for said cutter and for said slitter rockably mounted on said frame for movement toward and from the peripheral surface of said drum, said carriers forming bearing supports for the associated cutters and slitters, a motor, a gear coaxial with the axis of said drum driven by said motor and having driving connection with said drum, geared drive connections from said gear to said rotatable cutter and to said slitter, including gears coaxial with the axes of rocking movement of said carriers and meshing with said drive gear for said drum, and means rocking said carriers in a predetermined sequence in timed relation with respect to the speed of travel of said drum, for bodily bringing said rotatable cutter and said slitter into and out of cooperative cutting relation with respect to the surface of said drum.

5. In a garment bag making machine, a frame, a drum rotatably mounted on said frame and having a peripheral surface forming a material carrying and working surface, a rotatable cutter cooperating with said drum to cut a U-shaped tab in both sides of a flattened tube traveling about said drum, a slitter spaced circumferentially from said rotatable cutter in advance thereof and cooperating with said drum to transversely slit the tube in intersecting relation with respect to the base of the tab, to sever the tube into individual tubes of equal lengths having forwardly opening notches on the leading ends thereof, rockable carriers for said cutters and for said slitters rockably mounted on said frame for movement toward and from the peripheral surface of said drum, said carriers forming bearing supports for the associated cutter and slitter and supporting said cutter and said slitter for bodily movement toward and from the surface of said drum, a motor, a gear coaxial with the axis of said drum driven by said motor and having driving connection with said drum, geared drive connections from said gear to said rotatable cutter and to said slitter, including gears coaxial with the axes of rocking movement of said cutters and meshing with said drive gear for said drum, and means rocking said cutters in a predetermined sequence in timed relation with respect to the speed of travel of said drum, for bodily bringing said rotatable cutter and said slitter into and out of cooperative cutting relation with respect to the surface of said drum, comprising an individual eccentric for each carrier, a shaft coaxial with the axis of said drum and having said eccentrics mounted thereon, a geared drive connection from said drum drive gear to said eccentrics, said eccentrics being mounted on said shaft out of phase with respect to each other, and individual eccentric straps connecting said eccentrics with said carriers.

6. In a garment bag making machine, a frame, a drum rotatably mounted on said frame, the periphery of said drum forming a material carrying and working surface, means for driving said drum at a constant rate of speed comprising a motor, a drum drive gear coaxial with the axis of said drum and having driving connection therewith, and a geared drive connection from said motor to said drum drive gear, a rotatable cutter operable against the surface of said drum to cut a substantially U-shaped tab in both sides of a tube travelling along said drum, a rotatable slitter spaced circumferentially about said drum in advance of said rotatable cutter and adapted to slit the tube in intersecting relation with respect to the base portion of said tab, to sever the tube and leave a forwardly opening notch in the leading end thereof, bearing support means for said rotatable cutter and for said slitter comprising individual carriers for said rotatable cutter and said slitter, forming bearing supports for opposite ends of the associated rotatable cutter and rotatable slitter and supporting said rotatable cutter and said rotatable slitter for bodily movement toward and from the surface of said drum, one carrier of each set of carriers having a gear journalled therein, meshing with said drum drive gear, geared drive connections from said gears meshing with said drum drive gear to said rotatable cutter and said rotatable slitter for driving said cutter and said slitter at the peripheral speed of said drum, means supporting said carriers for pivotal movement about axes coaxial with the axes of rotation of said gears meshing with said drum drive gear, and means driven by said drum drive gear for sequentially rocking said carriers and bodily bringing said rotatable cutter and said slitter into and out of cooperative relation with respect to the surface of said drum.

7. A garment bag making machine in accordance with claim 6 in which the means for driving said rotatable cutter and said slitter into and out of cooperative relation with respect to the surface of said drum comprises individual eccentrics for each carrier, geared drive connections to said eccentrics, said eccentrics for one set of carriers being out of phase with respect to said eccentrics for the other set of carriers, and eccentric straps journalled on said eccentrics and having operative connection with associated carriers.

8. In a garment bag making machine, a frame, a drum mounted on said frame for rotation about a horizontal axis, a motor, means driven by said motor for driving said drum comprising a gear coaxial with the axis of rotation of said drum, a rotatable cutter spaced radially of said drum and mounted on said frame for bodily rockable movement toward and from the surface of said drum and cooperating with said drum to cut a substantially U-shaped tab in both sides of a flat tube traveling along said drum, a rotatable slitter spaced radially of said drum and circumferentially of said rotatable cutter and mounted for bodily rockable movement toward and from said drum and cooperating with said drum for transversely slitting the tube to intersect the base portion of the tab thereof and to sever the tube, means coaxial with the axis of rotation of said drum and driven by said gear for rotatably driving said cutter and said slitter, and other means driven by said gear for bodily moving said rotatable cutter and said slitter toward and from the periphery of said drum into and out of cooperative relation with respect to said drum in a predetermined sequence comprising a shaft coaxial with the axis of rotation of said drum, individual eccentrics for said rotatable cutter and said rotatable slitter mounted on said shaft out of phase with respect to each other, a geared drive connection to said eccentrics, and eccentric straps on said eccentrics having operative connection with the associated rotatable cutter and rotatable slitter for bodily moving said rotatable cutter and said rotatable slitter into and out of cooperative relation with respect to said drum in timed relation with respect to rotatable movement of said drum.

References Cited in the file of this patent
UNITED STATES PATENTS

| | | |
|---|---|---|
| 584,274 | Scott | June 8, 1897 |
| 884,633 | Bragdon | Apr. 14, 1908 |
| 1,571,983 | Weber | Feb. 9, 1926 |
| 1,581,236 | Speer | Apr. 20, 1926 |
| 2,369,253 | Robinson et al. | Feb. 13, 1945 |
| 2,553,052 | Kwitek | May 15, 1951 |
| 2,779,414 | Broden | Jan. 29, 1957 |

FOREIGN PATENTS

| | | |
|---|---|---|
| 618,832 | Germany | Sept. 17, 1935 |